United States Patent
Markie

(10) Patent No.: US 9,322,420 B2
(45) Date of Patent: Apr. 26, 2016

(54) FASTENING METHOD AND APPARATUS

(71) Applicant: TRW Automotive U.S. LLC, Livonia, MI (US)

(72) Inventor: Michael Markie, Roseville, MI (US)

(73) Assignee: TRW Automotive U.S. LLC, Livonia, MI (US)

( * ) Notice: Subject to any disclaimer, the term of this patent is extended or adjusted under 35 U.S.C. 154(b) by 0 days.

(21) Appl. No.: 13/794,968

(22) Filed: Mar. 12, 2013

(65) Prior Publication Data

US 2014/0259570 A1    Sep. 18, 2014

(51) Int. Cl.
| F16B 2/22 | (2006.01) |
| F16B 2/24 | (2006.01) |
| F16B 5/06 | (2006.01) |
| F16B 21/07 | (2006.01) |

(52) U.S. Cl.
CPC ............... *F16B 2/22* (2013.01); *F16B 5/0635* (2013.01); *B60K 2350/941* (2013.01); *F16B 2/24* (2013.01); *F16B 5/0614* (2013.01); *F16B 21/075* (2013.01); *Y10T 24/44923* (2015.01); *Y10T 29/49947* (2015.01)

(58) Field of Classification Search
USPC ........... 24/563, 297, 453, 458, 292, 294, 295, 24/573.09, DIG. 32, DIG. 33, 289, 291, 24/293; 293/155; 52/716.7
See application file for complete search history.

(56) References Cited

U.S. PATENT DOCUMENTS

| 6,665,914 | B2 * | 12/2003 | Ogawa | 24/297 |
| 7,401,388 | B2 * | 7/2008 | Hansen | 24/297 |
| 7,461,436 | B2 * | 12/2008 | Asano | 24/297 |
| 7,552,516 | B2 | 6/2009 | Okada et al. | |
| 8,056,193 | B2 | 11/2011 | Park | |
| 2002/0004971 | A1 * | 1/2002 | Ichimaru et al. | 24/297 |
| 2003/0079316 | A1 * | 5/2003 | Ogawa | 24/297 |
| 2006/0230587 | A1 * | 10/2006 | Okada | 24/297 |
| 2007/0050955 | A1 * | 3/2007 | Hansen | 24/297 |
| 2007/0189875 | A1 | 8/2007 | Ooyama et al. | |
| 2011/0209309 | A1 | 9/2011 | Camus | |

FOREIGN PATENT DOCUMENTS

| GB | 2381289 | 4/2003 |
| JP | 2006151371 | 6/2006 |
| JP | 2012167694 | 9/2012 |
| WO | 2007/126201 | 11/2007 |

* cited by examiner

*Primary Examiner* — Robert J Sandy
*Assistant Examiner* — Rowland Do
(74) *Attorney, Agent, or Firm* — Tarolli, Sundheim, Covell & Tummino LLP

(57) ABSTRACT

A fastener (10) includes a clamp arm (26) which is connected with a base (24). The clamp arm (26) cooperates with the base (24) to form an entrance (80) into which an article (14) extends. A first locking tab (40) extends from the base (24) into a first opening (64) in the article (14). A second locking tab (120) extends from the clamp arm (26) into a second opening (142) in the article. When a withdrawal force is applied to the fastener, an arcuate portion (116) of an inner side surface (108) of the clamp arm (26) moves from a position spaced from an outer side surface (164) of the article (14) to a position in which the arcuate portion of the inner side surface of the clamp arm is disposed in abutting engagement with the outer side surface of the article.

4 Claims, 4 Drawing Sheets

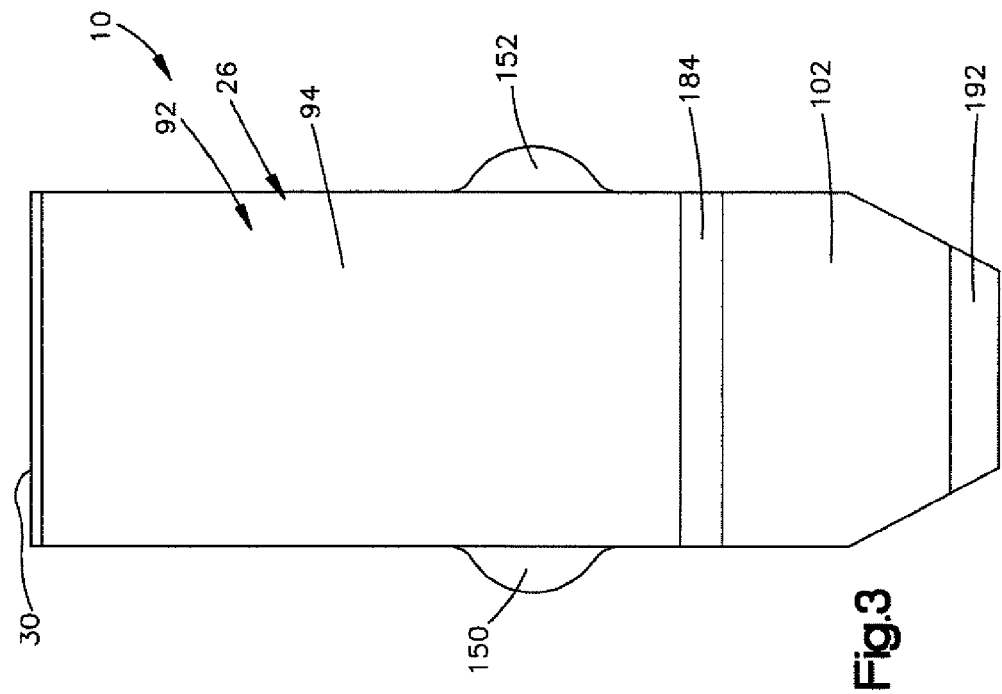
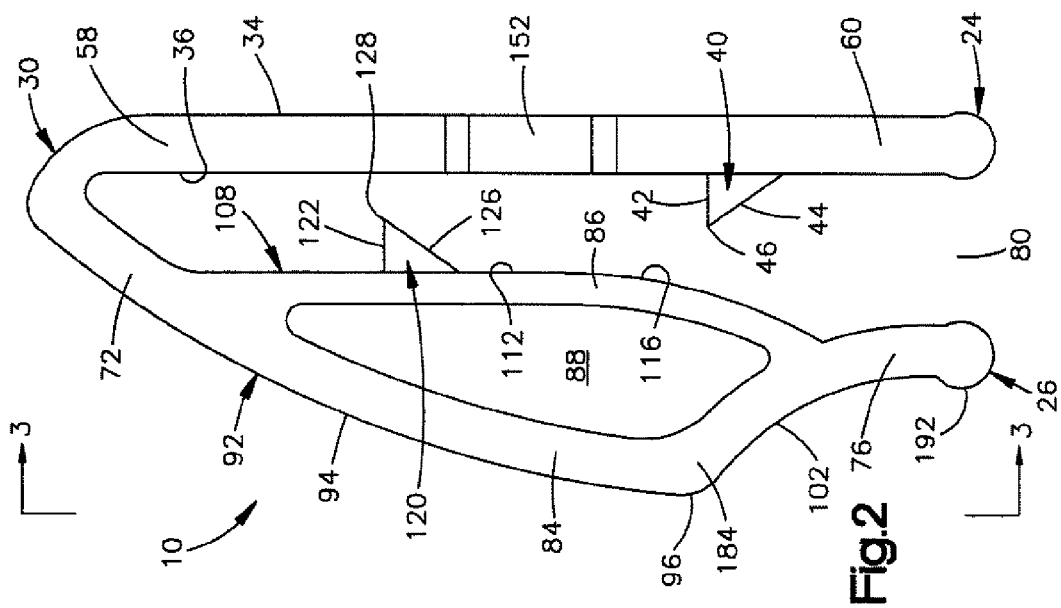

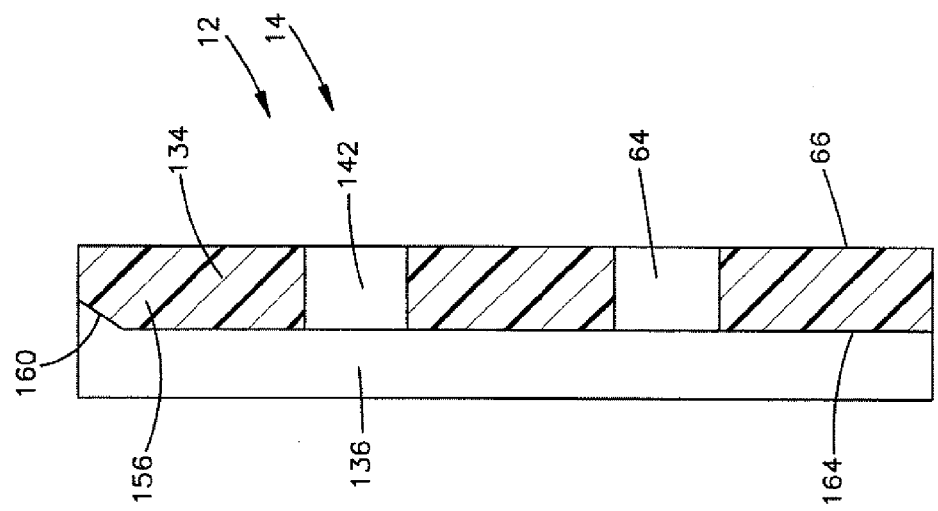
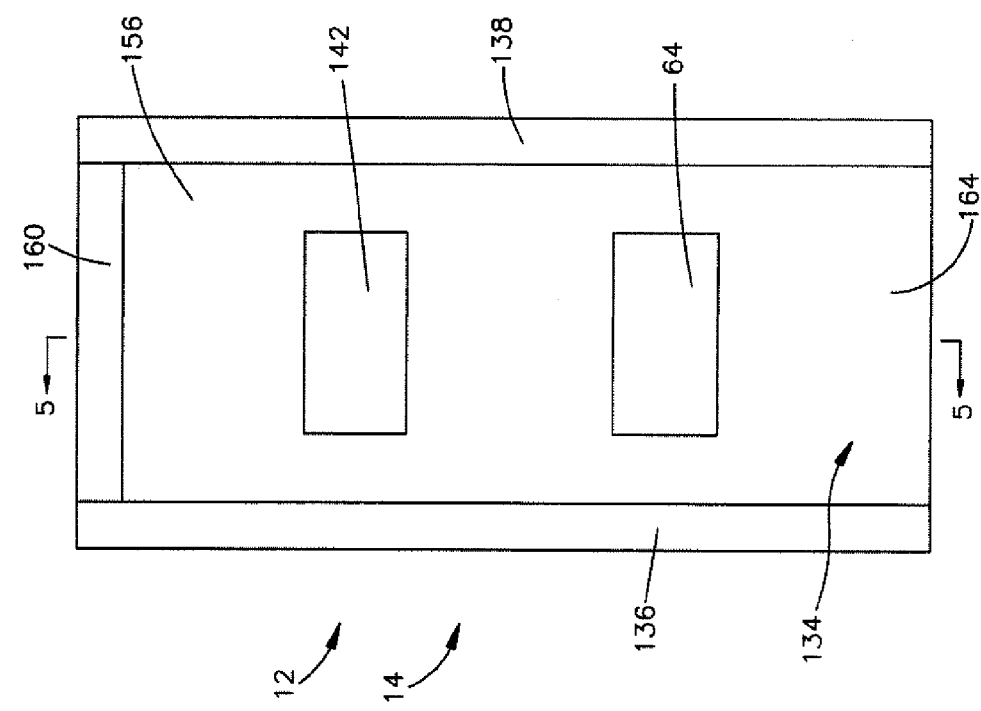

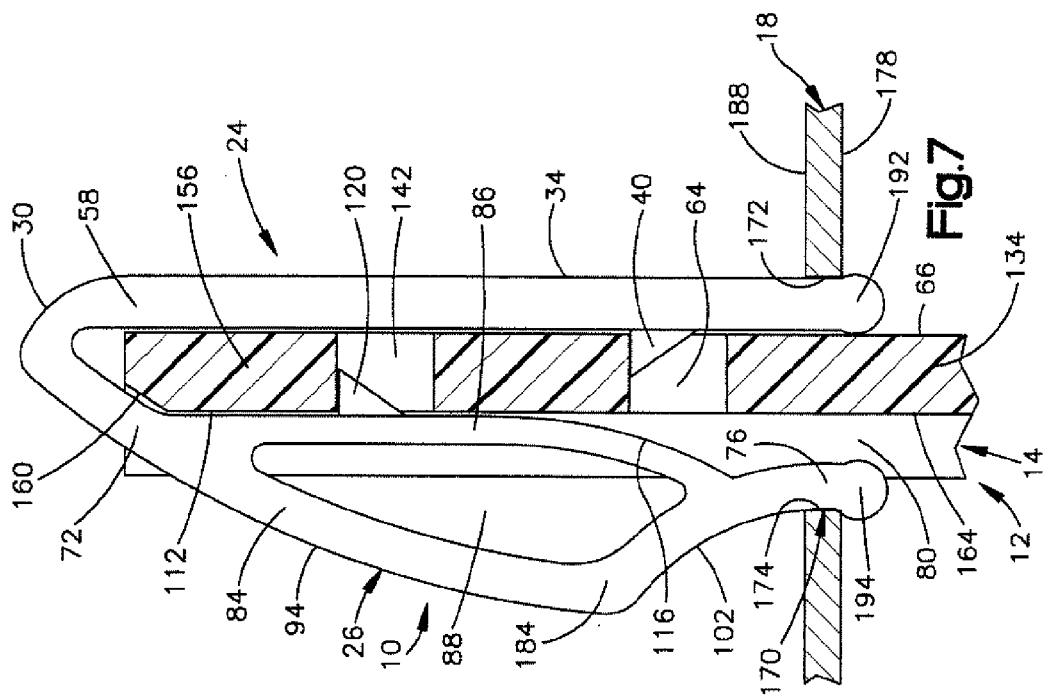
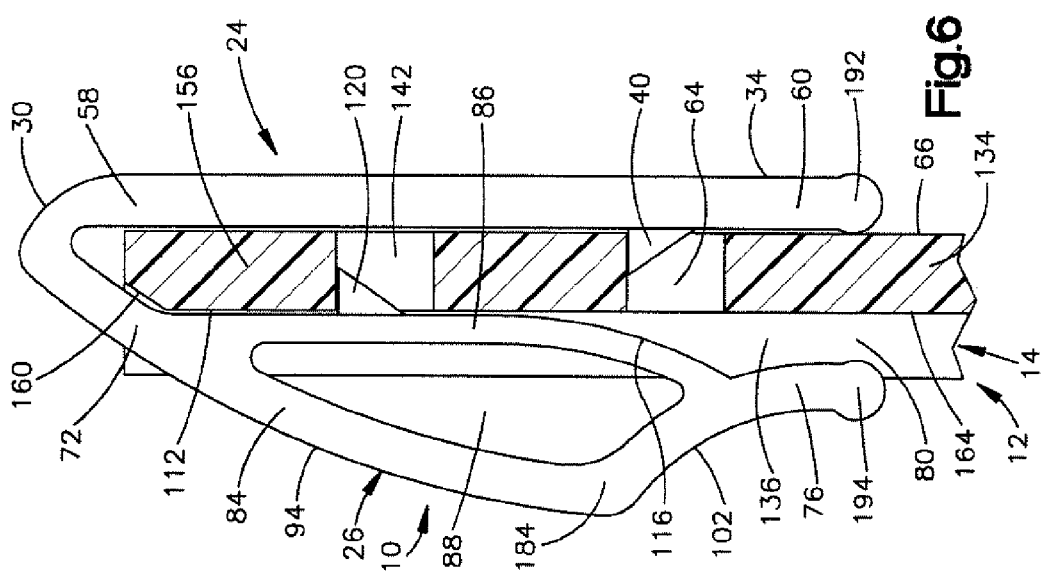

FASTENING METHOD AND APPARATUS

BACKGROUND OF THE INVENTION

The present invention relates to new and improved method and apparatus for connecting an article with a support structure.

Fasteners, which may be referred to as clips, have been utilized to mount articles on a support structure. Specifically, the fasteners have been utilized to mount an article on an instrument panel of a vehicle. The available space for a fastener on an instrument panel or other portion of a vehicle may be very limited. Therefore, it is desirable to have the fastener take up as little space as possible.

When force is applied to an article connected with an instrument panel of a vehicle or other support structure, the force may tend to pull the fastener from the support structure. This may result in disconnection of the article from the support structure. It is desirable to have the fastener resist a relatively large withdrawal force to prevent unintended disconnection of an article from the support structure. Known fasteners which have been utilized to connect an article with a support structure are disclosed in U.S. Pat. Nos. 8,056,193 and 7,552,516.

SUMMARY OF THE INVENTION

The present invention relates to a fastener which is utilized to connect an article with a support structure. The fastener includes a clamp arm having a first end portion which is connected with a first end portion of a base. The clamp arm has a second end portion which is spaced from a second end portion of the base and which cooperates with the second end portion of the base to form an entrance through which an article extends.

A first locking tab extends from an inner side surface of the base toward the clamp arm into an opening in the article. A second locking tab extends from an inner side surface of a clamp arm into a second opening in the article.

When a withdrawal force is applied to the article tending to remove the article from the support structure, the clamp arm is resiliently deflected. The resilient deflection of the clamp arm moves an arcuate portion of an inner side surface of the clamp arm from an initial position in which the arcuate portion of the inner side surface of the clamp arm is spaced from an outer side surface of the article. The inner side surface of the clamp arm moves to a position in which the arcuate portion of the inner side surface of the clamp arm is disposed in abutting engagement with the outer side surface of the article.

BRIEF DESCRIPTION OF THE DRAWINGS

The foregoing and other features of the invention will become more apparent upon a consideration of the following description taken in connection with the accompanying drawings wherein:

FIG. 2 is an enlarged schematic sectional view, taken generally along the line 2-2 of FIG. 1, illustrating the relationship of a clamp arm to a base of the fastener of FIG. 1;

FIG. 3 is an enlarged schematic plan view, taken generally along the line of 3-3 of FIG. 2, further illustrating the construction of the fastener;

FIG. 4 is an enlarged schematic plan view of a mounting portion of an article which is to be connected with a support structure by the fastener of FIGS. 1-3;

FIG. 5 is an enlarged schematic sectional view, taken generally along the line 5-5 of FIG. 4, further illustrating the construction of the mounting portion of the article;

FIG. 6 is an enlarged schematic sectional view depicting the manner in which the fastener of FIGS. 1-3 engages the article mounting portion of FIGS. 4 and 5; and FIG. 7 is an enlarged schematic sectional view depicting the manner in which the fastener of FIGS. 1-3 engages a support structure to connect the article mounting portion of FIGS. 4 and 5 with the support structure.

DESCRIPTION OF SPECIFIC PREFERRED EMBODIMENTS OF THE INVENTION

General Description

Figure 1:
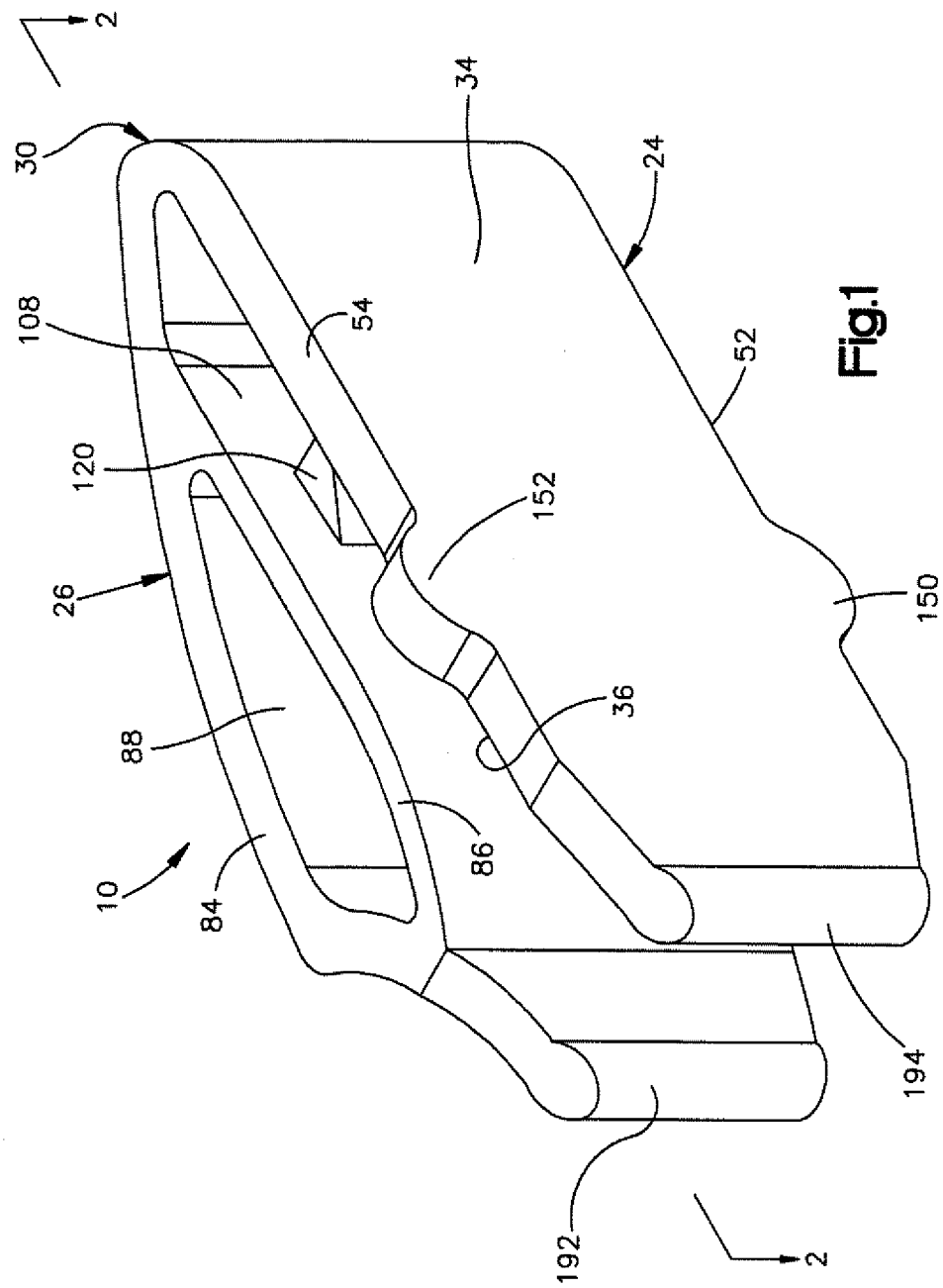
FIG. 1 is an enlarged schematic pictorial illustration of a fastener constructed in accordance with the present invention.

A fastener 10, constructed in accordance with the present invention, is illustrated in FIGS. 1-3. The fastener 10 is utilized to connect the mounting portion 12 (FIGS. 4 and 5) of an article 14 with a support structure 18 in the manner illustrated schematically in FIG. 7.

The mounting portion 12 of the article 14 is integrally molded as one piece with the article. However, it is contemplated that the mounting portion 12 may be formed separately from the article and connected with the article. For example, the mounting portion 12 may be connected with the article 14 by a screw, adhesive, or a joint formed between the mounting portion and the remainder of the article 14.

The fastener 10 (FIGS. 1-3) is integrally formed as one piece of a polymeric material. It is contemplated that the fastener 10 may be integrally molded as one piece of any desired polymeric material. The illustrated fastener 10 is formed of polyoxymethylene (POM). However, it should be understood that the fastener 10 may be formed of many different materials and may be formed as a plurality of interconnected pieces. For example, the fastener 10 may be formed by one or more metallic pieces connected with one or more polymeric pieces. Alternatively, the fastener 10 may be formed of metal.

The fastener 10 includes a base 24 (FIGS. 1 and 2) and a clamp arm 26. A flexible connector or hinge section 30 interconnects and is integrally formed as one piece with the base 24 and clamp arm 26. The connector section 30 is resiliently deflectable to enable relative movement to occur between the base 24 and clamp arm 26.

The base 24 has a flat outer side surface 34 which extends parallel to a flat inner side surface 36 (FIG. 2) of the base 24. A locking tab or projection 40 extends from the base 24 toward the clamp arm 26. The polygonal locking tab 40 has a rectangular latching surface 42 which extends perpendicular to the inner side surface 36 of the base 24. The locking tab 40 also has a rectangular cam surface 44 which extends at an acute angle to the inner side surface 36 of the base 24 and intersects the latching surface 42 at a linear nose portion 46 of the locking tab 40. The locking tab 40 extends only partway across the inner side surface 36 of the base 24 and is spaced from opposite edge portions 52 and 54 (FIG. 1) of the base 24.

The locking tab 40 is spaced from first or upper (as viewed in FIG. 2) end portion 58 of the base 24. The locking tab 40 is disposed relatively close to a second or lower end portion 60 of the base 24. The locking tab 40 is engagable with a lower (as viewed in FIGS. 4 and 5) opening 64 formed in the mounting portion 12 of the article 14. The lower opening 64 has a rectangular configuration corresponding to the configuration of the locking tab 40.

Fastener

In order to enable the fastener 10 (FIG. 2) to fit into very restricted space in a support structure, such as an instrument panel of a vehicle, the base 24 is formed by a single layer. Thus, the base 24 is relatively thin and has flat parallel inner and outer side surfaces 34 and 36. The inner side surface 36 can be positioned in abutting engagement with a flat back side surface 66 (FIGS. 5 and 6) of the mounting portion 12 of the article 14. The flat abutting engagement between the inner side surface 36 and the back side surface 66 of the mounting portion 12 (FIG. 6) tends to minimize the space required within an instrument panel or other support structure to receive the mounting portion 12 and fastener 10.

The clamp arm 26 is pivotal toward and/or away from the base 24 of the fastener 10 by resiliently deflecting the connector section 30 (FIG. 2). The clamp arm 26 has an upper (as viewed in FIG. 2) end portion 72 which is connected with the upper end portion 58 of the base 24 by the connector section 30. In addition, the clamp arm 26 has a lower end portion 76 which is spaced from the connector section 30. The lower end portion 76 of the clamp arm 26 cooperates with the lower end portion 60 of the base 24 to form an entrance opening 80 through which the mounting portion 12 extends when the fastener 10 and mounting portion 12 are interconnected in the manner illustrated schematically in FIG. 6.

The clamp arm 26 includes relatively stiff outer section 84 (FIG. 2) and a relatively flexible inner section 86. The inner and outer sections 84 and 86 of the clamp arm 26 are spaced apart from each other to form a space 88 within the clamp arm 26. The outer and inner sections 84 and 86 of the clamp arm 26 are integrally molded as one piece and are resiliently deflectable relative to each other to decrease the size of the space 88. By decreasing the size of the space 88, the size of the clamp arm 26 is decreased. This facilitates insertion of the fastener 10 into a relatively small opening in a support structure.

The outer section 84 of the clamp arm 26 is thicker than the inner section 86 of the clamp arm. This results in the inner section 86 of the clamp arm being more flexible than the outer section 84 of the clamp arm. It should be understood that it is contemplated that the clamp arm 26 may, if desired, be constructed with an outer section 84 and an inner section 86 of the same thickness and the same stiffness. Alternatively, the inner section 86 of the clamp arm 26 may have a greater thickness and stiffness than the outer section 84 of the clamp arm.

The clamp arm 26 (FIG. 2) has an outer side 92 which faces away from the base 24. The outer side 92 of the clamp arm 26 includes an arcuate surface 94 which curves arcuately outwardly from the connector section 30 to an end portion 96. The smooth gradual curve of the convex surface 94 results in a gradual increase in the force required to insert the fastener 10 in a relatively small space. The convex outer side surface 94 functions as a cam surface and forces the clamp arm 26 inwardly toward the base 24 when the fastener is inserted into a relatively small opening in a support structure.

In addition to the convex surface 94, the clamp arm 26 has an arcuate concave surface 102 (FIG. 2). The concave surface 102 extends from the end portion 96 of the convex surface 94 to the lower end portion 76 of the clamp arm 26. The concave surface 102 cooperates with the support structure to resist withdrawal of the fastener 10 from the support structure.

The concave surface 102 has a radius of curvature which is smaller than the radius of curvature of the convex arcuate surface 94 on the clamp arm 26. When a withdrawal force is applied to the fastener 10 in a direction tending to pull the fastener downward (as viewed in FIGS. 2 and 7); the concave surface 102 cooperates with the support structure 18 to provide a ramming action which resists withdrawal of the fastener from the support structure and tends to cam or force the clamp arm 26 toward the base 24. By providing the concave arcuate surface 102 with a relatively small, compared to the convex arcuate surface 94, radius of curvature, force required to pull the fastener 10 out of a support structure 18 increases quickly as the fastener moves downward (as viewed in FIGS. 2 and 7) relative to the support structure.

The inner section 86 (FIG. 2) of the clamp arm 26 has an inner side 108 which faces toward the base 24 and away from the outer section 84 of the clamp arm 26. The inner side 108 of the clamp arm 26 includes a flat or linear surface 112 which extends parallel to the inner side surface 36 of the base 24. In addition, the inner section 86 of the clamp arm 26 has an arcuate surface 116 which faces inwardly toward the base 24 and downwardly (as viewed in FIG. 2) toward the entrance opening 80. The arcuate surface 116 extends at an acute angle to the flat or linear surface 112 on the inner surface 86 of the clamp arm 26 and to the inner surface 36 on the base 24.

A locking tab 120 extends from the flat surface 112 on the inner side 108 of the inner section 86 of the clamp arm 26 toward the base 24. The locking tab 120 is disposed closer to the connector section 30 of the fastener 10 than is the locking tab 40 on the base 24. The locking tab 120 on the clamp arm 26 has the same configuration as the locking tab 40 on the base 24. However, the locking tab 120 on the clamp arm 26 is offset from the locking tab 40 on the base 24 in a direction toward the connector section 30 of the fastener 10.

The locking tab 120 (FIG. 2) has a polygonal configuration and includes a rectangular latching surface 122. The latching surface 122 extends perpendicular to the flat surface 112 on the clamp arm 26 and perpendicular to the flat inner side surface 36 on the base 24. The latching surface 122 on the locking tab 120 is of the same size and extends parallel to the latching surface 42 on the locking tab 40. A cam surface 126 on the locking tab 120 extends at an acute angle to the flat surface 112 on the clamp arm 26. The cam surface 126 on the locking tab 120 intersects the latching surface 122 at a linear nose portion 128 of the locking tab 120. The nose portion 128 of the locking tab 120 extends parallel to the nose portion 46 on the locking tab 40.

Mounting of Fastener on Article

The mounting portion 12 of the article 14 includes a flat panel 134 (FIGS. 4 and 5) which extends between a pair of parallel side rails 136 and 138. An upper opening 142 is formed in the panel 134 above (as viewed in FIG. 4) the opening 64. The openings 142 and 64 are the same size and aligned with each other. The rectangular opening 142 is offset upwardly from the lower opening 64 by a distance which corresponds to the distance between the latching surfaces 42 and 122.

The linear side rails 136 and 138 extend parallel to each other and are separated by a distance which corresponds to the width, as measured parallel to the connector section 30, of the clamp arm 26. This enables the clamp arm 26 to move into the space between the side rails 136 and 138.

A pair of projections 150 and 152 (FIGS. 1 and 3) are formed on the base 24 of the fastener 10. The projections 150 and 152 (FIG. 3) extend outward from the base by distance which is greater than the spacing between the rails 136 and 138. Therefore, the base 24 of the fastener 10 can not be positioned between the rails. This ensures that the fastener will be oriented so that the clamp arm 26 is positioned between the side rails 136 and 138 on the mounting portion 12 of the article 14.

When the fastener 10 is to be mounted on the article 14 (FIG. 6), the upper (as viewed in FIG. 4) end portion 156 on the mounting portion 12 is aligned with the entrance opening 80 (FIG. 2) with the mounting portion 12 of the article 14 disposed below (as viewed in FIG. 2) the fastener 10. The clamp arm 26 on the fastener 10 is aligned with the base between the side rails 136 and 138 on the mounting portion 12 (FIG. 4). The base 24 of the fastener 10 is aligned with the flat back side surface 66 (FIG. 5) of the mounting portion 12 of the article 14. The projections 150 and 152 (FIGS. 1 and 3) prevent accidental positioning of the base 24 of the front side of the mounting portion 12.

The fastener 10 is then moved downward toward the upper end portion 156 of the mounting portion 12. As this occurs, the arcuate surface 116 on the clamp arm 26 (FIGS. 2 and 6) engages a beveled surface 160 on the mounting portion 12. Contemporaneously therewith, the end portion 156 of the mounting portion 12 engages the locking tab 40.

Continued downward (as viewed in FIG. 6) movement of the fastener 10 toward the mounting portion 12 flexes the fastener at the connector portion 30 and moves the clamp arm 26 away from the base 24. Continued downward movement of the fastener 10 moves the lower (as viewed in FIGS. 2 and 7) locking tab 40 past the upper (as viewed in FIG. 4) opening 142 in the mounting portion 12. As this occurs, the clamp arm 26 moves along the space between the side rails 136 and 138 on the mounting portion 12.

The upper (as viewed in FIGS. 2 and 6) locking tab 120 moves into engagement with the cam surface 160 on the end portion 156 of the mounting portion 12. This results in further resilient flexing of the fastener 10 at the connector section 30 and movement of the clamp arm 26 away from the base 24. As this occurs, the clamp arm 26 moves downward along the flat front side surface 164 of the mounting portion 12 and is disposed between the side rails 136 and 138. The base 24 moves downwardly along the back side surface 66 of the mounting portion 12.

As the fastener 10 is moved downward along the mounting portion 12, the upper (as viewed in FIGS. 2 and 6) locking tab 120 moves into alignment with the upper opening 142 (FIG. 6) in the mounting portion 12. At the same time, the lower locking tab 40 moves into alignment with the lower opening 64 in the mounting portion 12. Continued downward movement of the fastener 12 results in the extent of flexure of the fastener 10 about the connector section being decreased by resilient flexing of the clamp arm 26 and base 24 toward each other. As this occurs, the locking tab 120 moves into the upper opening 142 in the mounting portion 12. Simultaneously therewith, the lower locking tab 40 moves into the lower opening 64 in the mounting portion 12.

At this time, the inner side surface 36 (FIG. 2) on the mounting portion 24 is in flat abutting engagement with the back side surface 66 (FIGS. 5 and 6) on the mounting portion 12. The flat surface 112 (FIGS. 2 and 6) on the inner section 86 of the clamp arm 26 is in flat abutting engagement with the flat surface 164 of the mounting portion 12. This results in the mounting portion 12 being gripped between the clamp arm 26 and base 24 of the fastener 10 in the manner illustrated schematically in FIG. 6.

In the foregoing description in the manner in which the fastener 10 is connected with the mounting portion 12, the fastener was described as moving downwardly relative to the mounting portion. However, it is contemplated that the mounting portion 12 of the article 14 may be moved upwardly relative to the fastener 10. Alternatively, the mounting portion 12 may be moved upwardly while the fastener 10 is moved downwardly. Regardless of how the mounting portion 12 and fastener 10 are moved relative to each other, the locking tabs 40 and 120 on the fastener 10 snap into the openings 142 and 64 in the mounting portion 12. Additionally, the flat inner side surface 36 on the base 24 is pressed against the flat back side surface 66 of the mounting portion 12. The flat surface 12 on the clamp arm 26 is pressed against the flat front side surface 164 of the mounting portion.

When the fastener 10 has been positioned on the mounting portion 12, in the manner illustrated in FIG. 6, only a portion of the inner side 108 (FIG. 2) of the clamp arm 26 is disposed in flat abutting engagement with the front side 164 of the panel 134 (FIG. 4). Thus, the flat surface 112 on the inside of the inner portion 86 of the clamp arm 26 is disposed in flat abutting engagement with the front side 164 of the mounting portion 12. However, the arcuate surface 116 on the inner section 86 of the clamp 26 curves downwardly (as viewed in FIG. 6) and outwardly or leftwardly away from the front side 164 of the panel 134. This results in the upper opening 142 in the panel 134 and the mounting portion 12 being blocked by the flat surface 112 on the inner section 86 of the clamp arm 26. However, the arcuate surface 116 is spaced from the portion of the panel 134 in which the lower opening 64 is disposed and does not block the lower opening 64. The blocking tab 120 is disposed in the upper opening 142.

Mounting of Fastener and Article on Support Structure

Once the fastener 10 has been positioned on the mounting portion 12 in the manner illustrated schematically in FIG. 6, the fastener 10 and the mounting portion 12 are inserted through an opening 170 (FIG. 7) in the support structure 18. The opening 170 has a rectangular configuration and includes a right side 172 and a left side 174. The left and right sides extend parallel to each other. The left and right sides 172 and 174 are spaced apart by a distance which is greater than the thickness of the side rails 136 and 138 (FIG. 4) on the mounting portion 12. The opening 170 (FIG. 7) is large enough to accommodate the base 24 and the lower end portion 76 of the clamp arm 26 when the clamp arm is disposed in engagement with a mounting portion 12 in the manner illustrated in FIG. 6.

The mounting portion 12 and fastener 10 are moved upwardly together into the opening 170 with the connector section 30 of the fastener 10 and the end portion 156 of the mounting portion 12 leading. As this occurs, the outer side surface 34 on the base 24 moves along and engages the right side 172 (FIG. 7) of the opening 170. At the same time, the lower left (as viewed in FIG. 7) corner of the opening 170, that is the corner formed by the left side 174 and the lower major side surface 178 of the support structure 18, engages the convex outer side surface 94 on the outer section 84 of the clamp arm 26.

The force applied against the clamp arm 26 presses the inner section 86 of the clamp arm 26 firmly against the front side surface 164 of the panel 134 in the mounting portion 12. At the same time, the right side 172 of the opening 170 presses the base 24 firmly against the back side surface 66 of the panel 134.

Continued application of an upwardly (as viewed FIG. 7) directed force to the mounting portion 12 causes the outer section 84 of the clamp arm 26 to be cammed inwardly toward the inner section 86 of the clamp arm 26. As this occurs, both the outer section 84 and inner section 86 of the clamp arm 26 are resiliently deformed. However, the inner section 86 of the clamp arm 26 is thinner and more flexible than the outer section 84 of the clamp arm 26. Therefore, the inner section 86 is resiliently deformed to a greater extent than the outer section 84.

As this occurs, the arcuate surface 116 on the inside of the portion 86 of the clamp arm 26 is pressed into flat abutting engagement with the front side 164 of the panel 134. As the clamp arm 26 is resiliently compressed and after the inner section 86 has been deflected sufficiently to move the entire arcuate surface 116 into flat abutting engagement with the front side 164 of the panel 134, the outer section 84 of the clamp arm 26 is further deflected to further compress the clamp arm 26. As the clamp arm 26 is resiliently compressed by engagement with the portion of the support structure 18 in which the opening 170 is formed, the size of the space 88 between the outer section 84 and inner section 86 of the clamp arm is decreased.

As the mounting portion and fastener 10 continues to move upward (as viewed in FIG. 7) relative to the support structure 18, the area of engagement of the clamp arm 26 with the side 174 of the opening 170 moves along the clamp arm to a shoulder 184. The shoulder 184 is formed between the convex side surface 94 on the clamp arm 26 and the concave surface 102.

As the shoulder 184 moves upwardly through the opening 170 in the support structure 18, the clamp arm 26 begins to resiliently expand. As this occurs, the concave surface 102 (FIG. 7) moves along the left side 174 of the opening 170. As the clamp arm 26 resiliently expands, the size of the space 88 increases and the outer section 84 moves away from the inner section 86 of the clamp arm. At the same time, the arcuate surface 116 on the inner section 86 of the clamp arm 26 begins to move away from the front side 164 of the panel 134.

As the fastener 10 and mounting portion 12 continue to move upwardly, the base 34 slides along the right side 172 of the opening 170 while the concave surface 102 slides along the left side 174 of the opening. At approximately the same time, spherical projections 192 and 194 on the fastener 10 move into engagement with the lower major side surface 178 of the support structure 18. As this occurs, upward movement of the mounting portion 12 and fastener 10 is interrupted with the fastener in the position illustrated schematically in FIG. 7 relative to the support structure 18.

At this time, the resilience of the outer section 84 and inner section 86 of the clamp arm 26 will have moved the arcuate surface 116 on the inner section 86 of the clamp arm away from the front side 164 of the mounting portion 12. The locking tabs 40 and 120 will be disposed in the openings 64 and 142 in the mounting portion 12 to hold the mounting portion 12 of the article 14 securely in place on the support structure 18.

Fastener Withdrawal Resistance

Once the mounting portion 12 and the fastener 10 have been installed into the support structure 18, in the manner illustrated in FIG. 7, the fastener 10 resists withdrawal of the mounting portion 12 of the article 14 from the support structure 18. Thus, if a downward (as viewed in FIG. 7) force supplied to the mounting portion 12 of the article 14, the force is transferred from the mounting portion to the locking tabs 40 and 120 on the fastener 10. This results in the fastener 10 being pulled downward (as viewed in FIG. 7) with the mounting portion 12 of the article 14.

As the fastener 10 is pulled downward, the concave surface 102 on the clamp arm 26 engages the left side 174 of the opening 170. As this occurs, the arcuately curving concave surface 102 cams the clamp arm 26 inwardly toward the base 24. This camming action results in the inner section 86 of the clamp arm 26 being firmly pressed against the front side 164 of the panel 134 in the mounting portion 12. This force holds the locking tab 120 on the clamp arm 26 securely in the opening 142 in the mounting portion 12 of the article 14.

In addition, the force transmitted between the left side 174 of the opening 170 and the concave surface 102 on the clamp arm 26 presses the back side surface 34 of the base 24 firmly against the right side 172 of the opening 170. This results in the locking tab 40 being securely held in the opening 64 in the mounting portion 12. Thus, force applied to the article 14 tending to pull the mounting portion 12 from the fastener 10 merely results in the locking tabs 40 and 120 being pressed more firmly into the openings 64 and 142 of the mounting portion 12.

By the time the fastener 10 has moved downward for a distance sufficient to move approximately one-half of the concave surface 102 along the left (as viewed in FIG. 7) side 174 of the opening 170, the lower end portion 76 of the clamp arm 26 and the arcuate surface 116 will have been firmly pressed against the front side 164 of the mounting portion 12 by the camming interaction between the concave surface 102 and the left (as viewed in FIG. 7) portion of the opening 170. Once the inner section 86 of the clamp arm 26 has been firmly pressed against the front side 164 of the mounting portion 12 by the camming action between the support structure 18 and concave surface 102, any further downward movement of the fastener 10 will require deflecting the relatively stiff outer section 84 of the fastener 10 under the influence of force applied against the concave surface 102 by the support structure 18.

Since the concave surface 102 has a relatively small radius of curvature, a relatively large force will have to be transmitted between the concave surface 102 and the support structure 18 before the fastener can be pulled further downward. It is only by applying a force which is sufficient to cause resilient deflection of the outer section 84 of the clamp arm 26 that the fastener 10 can be pulled through the opening 170. The interaction between the opening 170 and the concave surface 102 results in the mounting portion 12 of the article 14 being firmly gripped between the clamp arm 26 and base 34. This secure gripping action makes it extremely difficult, if not impossible for the fastener 10 to be stripped off or peeled away from the mounting portion 12 of the article 14.

If it is desired to remove the mounting portion 12 and fastener 10 from the support structure 18, a relatively thin tool is inserted upwardly through the space between the front side of a panel 134 and the inner section 86 of the clamp arm 26. This tool is twisted to apply force to the inner section 86 of the clamp arm 26 to deflect the inner section 86 of the clamp arm toward the left (as viewed in FIG. 7) and to move the locking tab 120 from the upper opening 142 in the mounting portion 12. Subsequent downward pulling on the mounting portion 12 results in the mounting portion moving downwardly passed the nose portion 128 of the locking tab 120 partially release the fastener 10 from the mounting portion 12. Subsequent application of downward force to the mounting portion 12 enables the mounting portion and fastener to be pulled from the opening 170 in the support structure 18.

Having described the invention, the following is claimed:

1. A fastener for connecting an article with a support structure, said fastener comprising
    a base,
    a clamp arm integrally formed as one piece with said base, said clamp arm having a first end portion which is connected with said base at a first end portion of said base, said clamp arm having a second end portion which is spaced from a second end portion of said base and which cooperates with said second end portion of said base to form an entrance through which the article extends,
    a first locking tab extending from an inner side surface of said base toward said clamp arm into a first opening in the article, said first locking tab being spaced from said first end portion of said base and disposed adjacent to said second end portion of said base, and a second locking tab extending from an inner side surface of said clamp arm toward said base into a second opening in the article, said second locking tab being spaced from said second end portion of said clamp arm and disposed adjacent to said first end portion of said clamp arm, wherein said inner side surface of said clamp arm includes a linear portion from which said second locking tab extends and an arcuate portion which is disposed between said linear portion of said inner side surface of said clamp arm and said second end portion of said clamp arm, said linear portion of said inner side surface of said clamp arm extends parallel to said inner side surface of said base, said inner side surface of said base and said linear portion of said inner side surface of said clamp arm being disposed in flat abutting engagement with opposite sides of the article, said arcuate portion of said inner side surface of said clamp arm curves outwardly away from said inner side surface of said base.

2. A fastener as set forth in claim 1 wherein said clamp arm has an outer side surface which faces away from said base, said outer side surface of said clamp arm includes a convex surface which extends from said first end portion of said camp arm toward said second end portion of said clamp arm, said convex surface on said outer side of said clamp arm has a first radius of curvature, said outer side of said clamp arm includes a concave surface which extends from said convex surface toward said second end portion of said clamp arm, said concave surface on said outer side of said clamp arm has a second radius of curvature which is less than said first radius of curvature.

3. A fastener for connecting an article with a support structure, said fastener comprising
   a base,
   a clamp arm integrally formed as one piece with said base, said clamp arm having a first end portion which is connected with said base at a first end portion of said base, said clamp arm having a second end portion which is spaced from a second end portion of said base and which cooperates with said second end portion of said base to form an entrance through which the article extends, said clamp arm having an outer section and an inner section which are integrally formed as one piece and are spaced apart to form an open space which is disposed in said clamp arm between said outer and inner sections, said inner section of said clamp arm has a thickness which is less than a thickness of said outer section of said clamp arm to facilitate resilient deflection of said inner section of said clamp arm under the influence of force applied against an outer side surface of said outer section of said clamp arm,
   a first locking tab extending from an inner side surface of said base toward said clamp arm into a first opening in the article, said first locking tab being spaced from said first end portion of said base and disposed adjacent to said second end portion of said base, and
   a second locking tab extending from an inner side surface of said clamp arm on said inner section of said clamp arm toward said base into a second opening in the article, said second locking tab being spaced from said second end portion of said clamp arm and disposed adjacent to said first end portion of said clamp arm.

4. A fastener for releasably connecting an article with a support structure, said fastener comprising:
   a base,
   a clamp arm having a first end portion which is connected with said base at a first end portion of said base, said clamp arm having a second end portion which cooperates with a second end portion of said base to form an entrance through which the article extends,
   an inner side surface of said clamp arm faces toward said base and includes a linear portion adjacent to said first end portion of said clamp arm and an arcuate portion which is disposed between said linear portion of said inner side surface of said clamp arm and said second end portion of said clamp arm, said arcuate portion of said inner side surface of said clamp arm curves outwardly away from said inner side surface of said base,
   an outer section of said clamp arm and an inner section of said clamp arm are integrally formed as one piece and are spaced apart to form an open space which is disposed in said clamp arm between said outer and inner sections, said outer section of said clamp arm has an outer side surface which faces away from said base, said outer side surface of said clamp arm includes a convex surface which extends from said first end portion of said clamp arm toward said second end portion of said clamp arm, said outer side surface of said clamp arm includes a concave surface which extends from said convex surface toward said second end portion of said clamp arm,
   a first locking tab extending from an inner side surface of said base toward said clamp arm, said first locking tab being spaced from said first end portion of said base and disposed adjacent to said second end portion of said base, and
   a second locking tab ending from said linear portion of said inner side surface of said clamp arm toward said base, said second locking tab being spaced from said second end portion of said clamp arm and disposed adjacent to said first end portion of said clamp arm.

* * * * *